(12) United States Patent
Deutsch

(10) Patent No.: US 11,066,166 B2
(45) Date of Patent: Jul. 20, 2021

(54) RELEASE UNIT FOR DRONES

(71) Applicant: Top Race Inc., Brooklyn, NY (US)

(72) Inventor: Mayer David Deutsch, Brooklyn, NY (US)

(73) Assignee: Top Race Inc., Brooklyn, NY (US)

( * ) Notice: Subject to any disclaimer, the term of this patent is extended or adjusted under 35 U.S.C. 154(b) by 246 days.

(21) Appl. No.: 16/139,295

(22) Filed: Sep. 24, 2018

(65) Prior Publication Data
US 2019/0092468 A1 Mar. 28, 2019

Related U.S. Application Data

(60) Provisional application No. 62/562,619, filed on Sep. 25, 2017.

(51) Int. Cl.
*B64D 1/02* (2006.01)
*B64C 29/00* (2006.01)
*B64C 39/02* (2006.01)
*B64C 13/04* (2006.01)

(52) U.S. Cl.
CPC .............. *B64D 1/02* (2013.01); *B64C 13/042* (2018.01); *B64C 29/0091* (2013.01); *B64C 39/024* (2013.01); *B64C 2201/027* (2013.01); *B64C 2201/108* (2013.01); *B64C 2201/128* (2013.01); *B64C 2201/146* (2013.01)

(58) Field of Classification Search
CPC ........................... B64D 1/02; B64C 2201/128
See application file for complete search history.

(56) References Cited

U.S. PATENT DOCUMENTS

| 2015/0239559 A1* | 8/2015 | Uskert | B64D 7/08 244/137.4 |
| 2018/0022455 A1* | 1/2018 | McCaslin | B64D 47/08 244/137.4 |
| 2019/0002124 A1* | 1/2019 | Garvin | H04N 5/23238 |
| 2019/0092447 A1* | 3/2019 | Schwarzbach | G03B 15/006 |

FOREIGN PATENT DOCUMENTS

DE 202015105415 U1 * 10/2015 ............. A62B 99/00

* cited by examiner

*Primary Examiner* — Richard G Davis
(74) *Attorney, Agent, or Firm* — Tarter Krinsky & Drogin LLP

(57) ABSTRACT

A unit that is mountable to an underside of drone to attach an attachment to the drone and then release the attachment after the drone is airborne. The unit is provide with a retractable bar that is controllable via a remote controller. In use, an attachment is suspended from the bar and once the drone becomes airborne, a user may retract the bar via remote control to drop the attachment previously suspended from the bar.

4 Claims, 5 Drawing Sheets

RELEASE UNIT FOR DRONES

RELATED APPLICATIONS

This application claims the benefit of U.S. Prov. Appl. 62/562,619, filed Sep. 25, 2017, the contents of which are incorporated by reference herein.

FIELD OF THE INVENTION

The invention relates to the field of drone accessories, more specifically to an drone attachment unit that allows the release of objects from an airborne drone.

BACKGROUND OF THE INVENTION

Drones are becoming increasingly popular for hobbyists and professionals alike. For instance, drones are becoming increasingly popular for purposes of aerial photography. Aside from photography, today's drones have limited utility to recreational users and hobbyists.

SUMMARY OF THE INVENTION

Embodiments of the invention are directed to a release unit that is affixable to drones, thereby allowing the drone to carry an object into the air and then release the object at a desired time.

Other principal features and advantages of the invention will become apparent to those skilled in the art upon review of the following drawings, and the detailed description.

DETAILED DESCRIPTION OF THE INVENTION

Embodiments of the present invention will now be described with reference to the above-identified Drawings. However, the Drawings and the description herein are not intended to limit the scope of the claims. It will be understood that various modifications of the present description are possible without departing from the spirit of the invention. Also, features described herein may be omitted, additional features may be included, and/or features described herein may be combined in a manner different from the specific combinations recited herein, all without departing from the spirit of the invention.

Figure 1A:
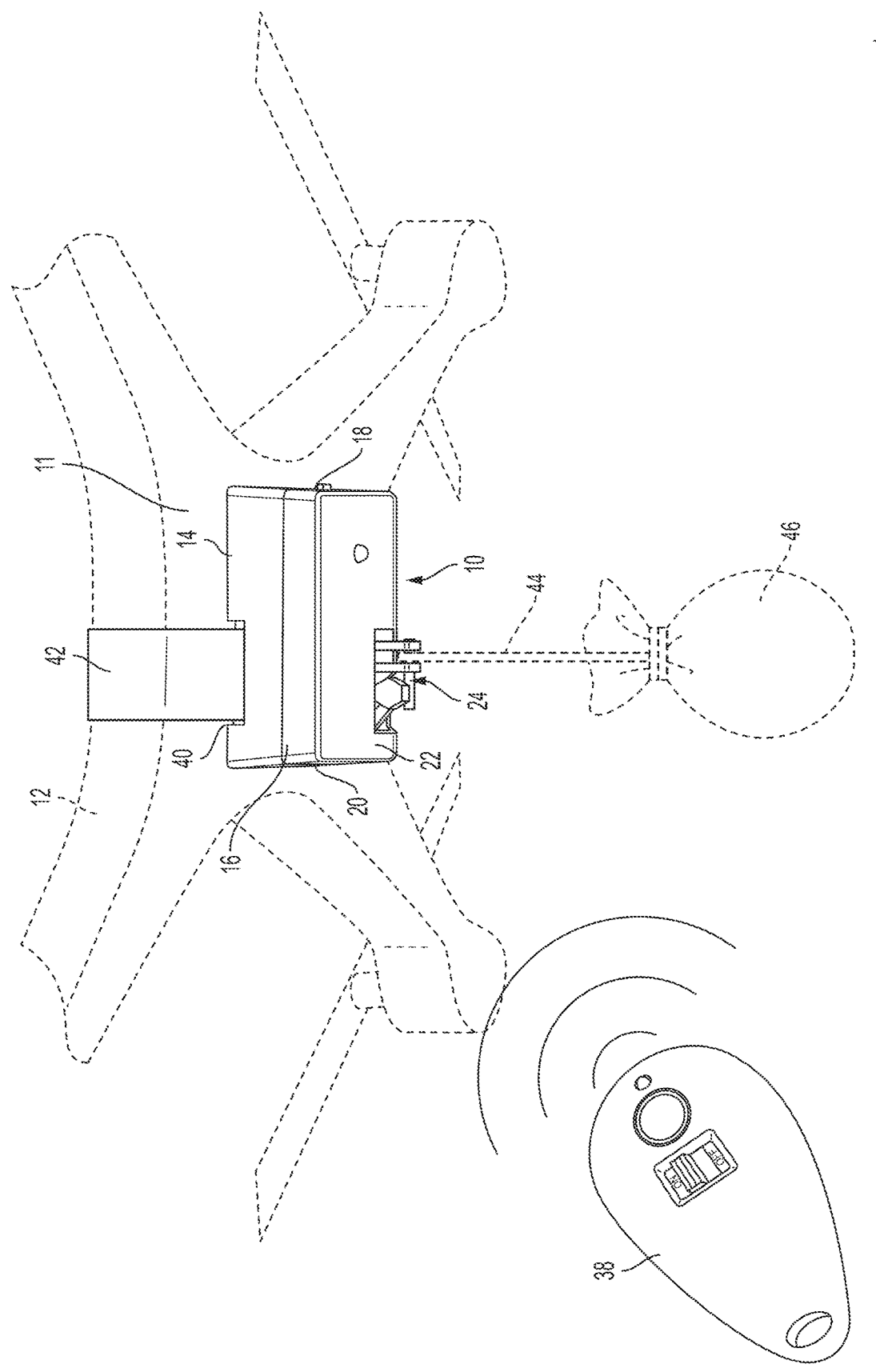
FIG. 1A is a schematic view of a release unit affixed to a drone according to an embodiment of the invention.

FIG. 1A shows a schematic view of a drone release unit 10 attached to a drone 12 with an attachment secured to the release unit 10. As shown, release unit 10 is a device that is substantially sized and shaped to be positioned on an underside surface of a drone 12.

Figure 3:
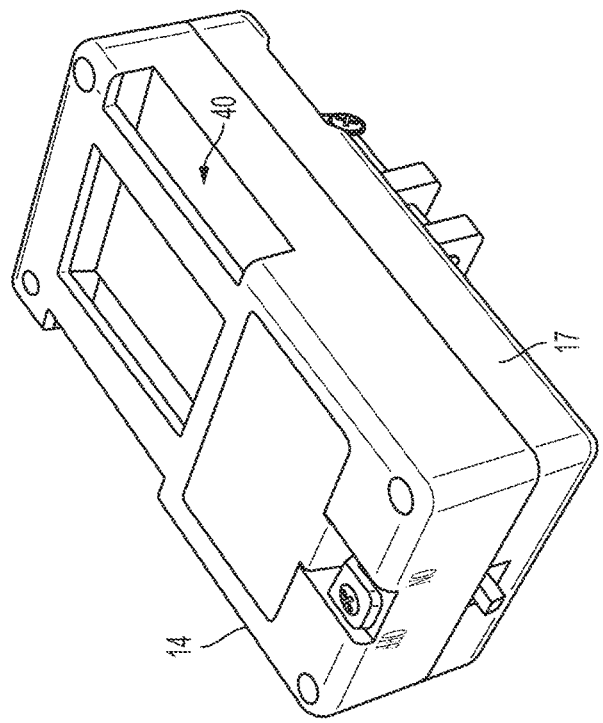
FIG. 3 is a top perspective view of a release unit according to an embodiment of the invention.
Figure 6:
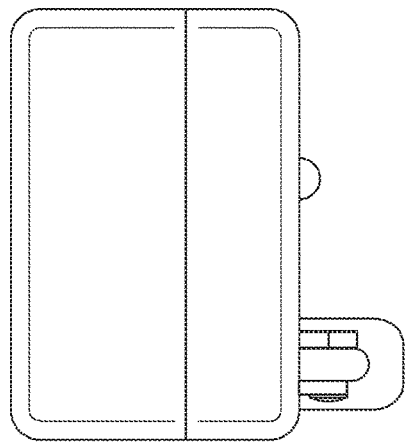
FIG. 6 is a front view of a release unit according to an embodiment of the invention.
Figure 8:
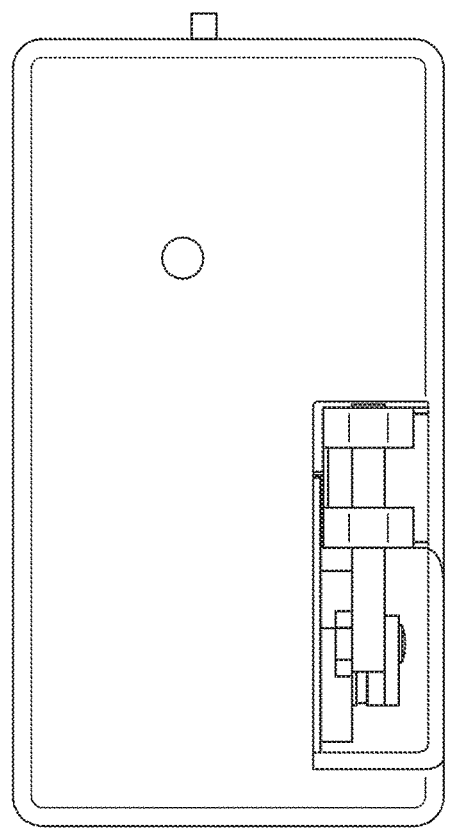
FIG. 8 is a top view of a release unit according to an embodiment of the invention.
Figure 7:
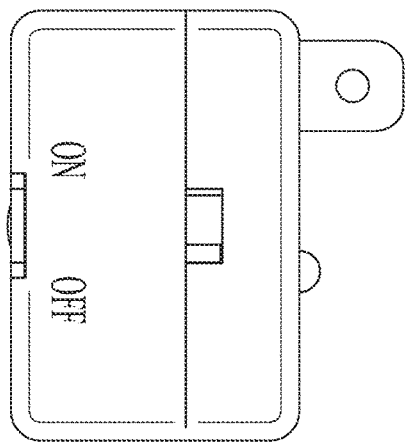
FIG. 7 is a rear view of a release unit according to an embodiment of the invention.
Figure 9:
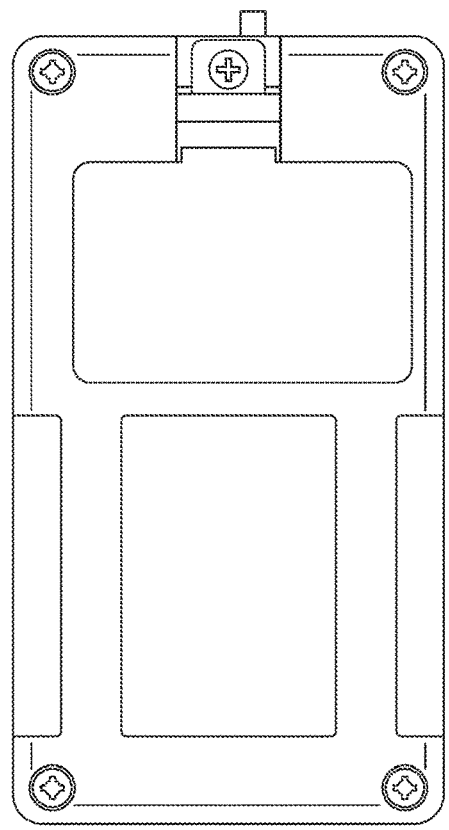
FIG. 9 is a bottom view of a release unit according to an embodiment of the invention.

Unit 10 is formed of an outer housing that encloses mechanical and electrical elements. As shown, unit 10 has a top wall 14 (best shown in FIG. 3) that is configured to contact an underside surface 11 of a drone 12. A first side wall 16 and a second opposing sidewall 17 descend downwardly from the top wall 14. A front wall 18 and an opposing rear wall 20 are also shown descending from the top wall 14. Side walls 16, 17 and front and rear walls 18, 20 terminate in a bottom wall 22. Bottom wall 22 is substantially parallel to top wall 14.

As shown, in embodiments of the invention, a downward-facing release mechanism 24 is positioned or projects through the bottom wall 22 of unit 10. In the embodiment shown, release mechanism 24 is a cylinder or similar bar 26 that is configured to be move forward and backward. In this regard, bar 26 moves forward to secure an attachment and it moves backward to release an attachment. For example, referring to FIG. 2B, bar 26 is shown disposed in a first lateral position. Such position is the "retracted position." FIG. 2A shows bar 26 moved to a second lateral position. The second position is the "deployed position."

Still referring to FIG. 2A, bar 26 is shown disposed positioned substantially parallel to bottom wall 22 of unit 10. Bar 26 has a first end and a second free end. The first end is joined by a pivot 27 or axle to a connecting arm 28. Connecting arm 28 is linked to a small motor or similar motion-generating device. Second end of bar 26 is configured to secure an attachment.

In an embodiment of the invention, an attachment compartment is configured to retain an attachment. The attachment compartment is formed of a first post 30 and a substantially parallel second post 32. First post 30 and second post 32 are disposed orthogonally to bar 26. In embodiments of the invention, first post 30 has a hole 34 through its thickness. Hole 34 is sized and shaped to be incrementally larger than the diameter of bar 26. Second post 32, has a pocket 36 that has substantially of the same diameter of hole 34. Bar 26 inserts though hole 34 in the first post.

Figure 2B:
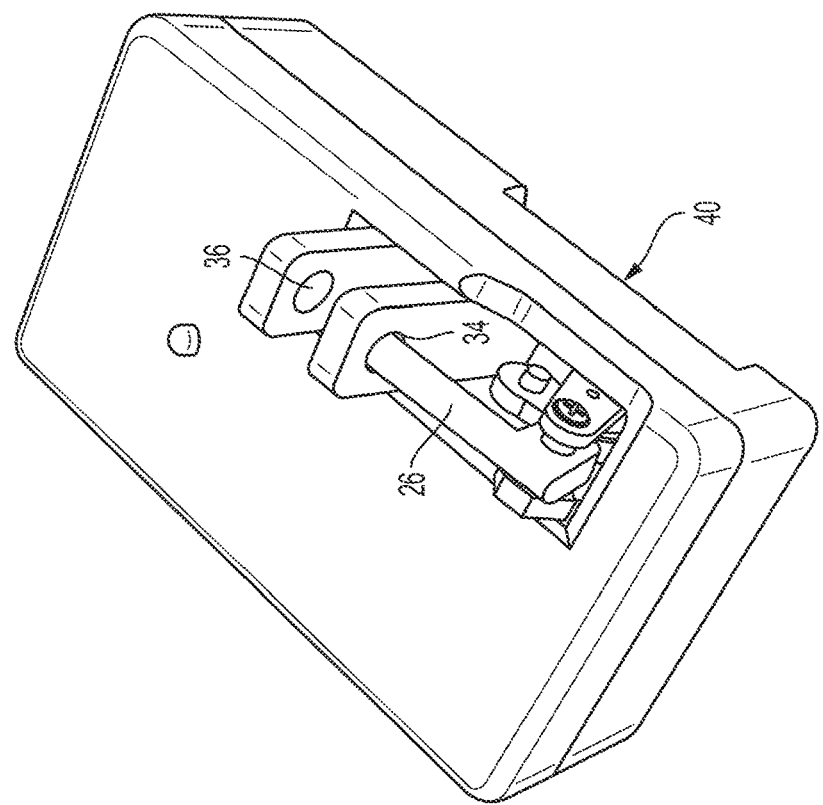
FIG. 2B is a bottom perspective view of a release unit shown in an open position according to an embodiment of the invention.
Figure 2A:
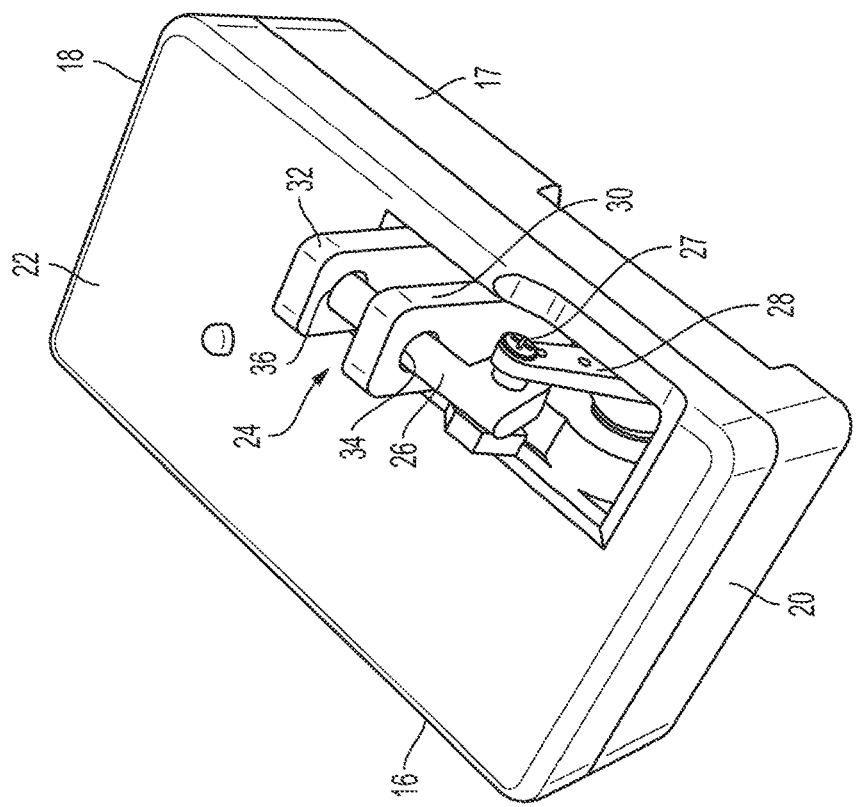
FIG. 2A is a bottom perspective view of a release unit shown in a closed position according to an embodiment of the invention.
Figure 4:
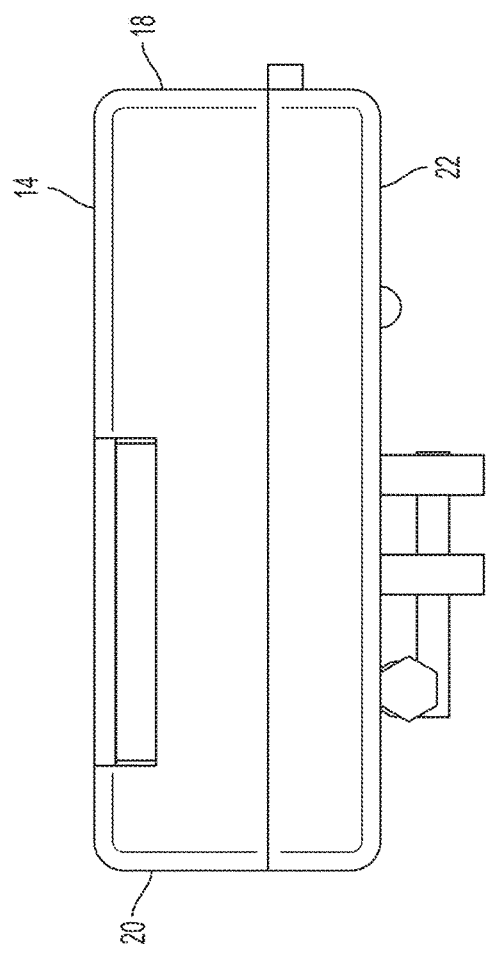
FIG. 4 is a left side view of a release unit according to an embodiment of the invention.
Figure 5:
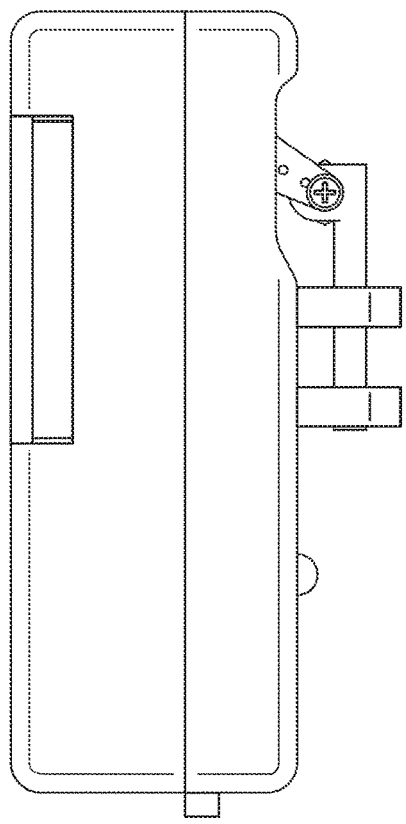
FIG. 5 is a right side view of a release unit according to an embodiment of the invention.

In embodiments of the invention, in the first position (as shown in FIG. 2B), second end of bar 26 rests within the confines of hole 34. In the second position (as shown in FIG. 2A), bar 24 traverses the distance between the first post 30 and the second post 32 and rests in pocket 36 of second post 32.

In use, in order to load an attachment to the unit 10, a user begins with bar 26 at the first position, whereby the attachment compartment is open. The user inserts a segment of a loop or similar retaining device into attachment compartment (i.e. in the space between the first post 30 and second post 32). Next, the user moves the bar 26 into the second position. In this manner, bar 26 inserts through the loop so that the loop may become suspended from the bar 26 during flight of the drone 12. First post 30 and second post 32 restrict lateral movement of the loop. This ensures that the loop remains secured to the unit 10 during flight.

In embodiments of the invention movement of the bar 24 in the first and second direction is produced by a motor or an electromagnetic actuator such as solenoid. The motor may be a simple bi-directional motor such as, for example a servo motor. Alternatively, movement of bar may be caused by a leadscrew or such similar translation screw.

In embodiments of the invention, a motor, solenoid, leadscrew or any other such device for driving motion is configured to move a predetermined distance in a first direction and a predetermined distance in a second, opposite direction. The motor and associated electronic elements are stored within the housing of unit 10. It will be understood by one of ordinary skill in the art that one or more batteries are provided in the unit 10 to supply electric power to the motor and other components.

In embodiments of the invention, the motor (or similar motion-producing mechanism) is controlled by a remote controller 38. In embodiments of the invention, unit 10 is provided with a remote control receiver for receiving a remote control signal (e.g. an analogue or digital RF signal) transmitted by remote controller 38. The remote controller 38 is provided with a switch (e.g. a momentary switch) that controls the movement of the motor that drives bar 26 from the first position to the second position and vice versa.

As shown, a slot 40 is made in sidewall 16 that spans the device and opens on second sidewall 17. Slot 40 is configured to receive a band such as for example a Velcro strap 42. In FIG. 1A a Velcro strap 42 is shown inserted through slot 40 and extending therefrom to wrap around a body of a drone 12. In this manner, top wall 14 of unit 10 remains pressed against underside surface 11 of drone 12 and, thusly, securely affixed to the drone 10. It will be understood that top wall 14 of unit 10 is substantially flat allowing it to remain pressed against the underside surface 11 of the drone 12 to provide increased stability.

In use, a user first secures the unit 10 to the underside surface of a drone 12 by aligning the unit 10 beneath the drone 12 such that upper wall 14 contacts the underside surface 11 of the drone 12. Thereafter, the user inserts a first end of strap 42 through slot 40 on a first side wall (e.g. 16). The strap 42 exits on the opposite side wall (e.g. 17) and is wrapped around the drone 12. The two ends of strap 42 are joined together by respective Velcro ends. Once so installed on a drone 12, the user inserts a loop 44 or ring structure into the attachment compartment in a manner such that bar 26 may insert through the loop 44. As will be understood, the loop 44 or ring may be attached to a water balloon 46, a confetti bag, a parachute, bundle of leaflets or any other item or items that a user wishes to drop from the drone 12. The user then actuates the motor (e.g. via the remote controller 38) to move bar 26 into the second position so that it inserts through the loop and its terminal end inserts into pocket 36 of second post 32.

Figure 1B:
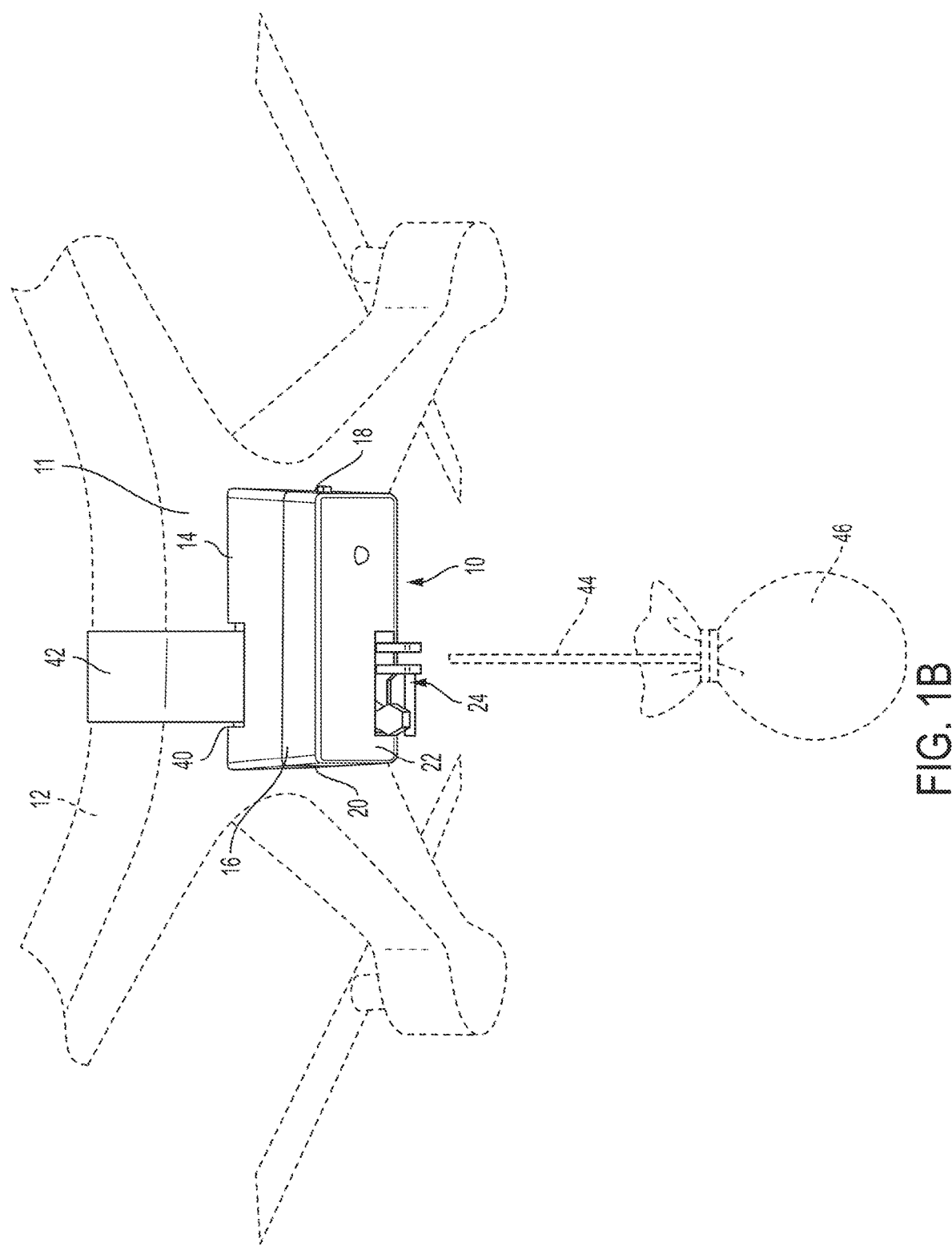
FIG. 1B is a schematic view of a release unit affixed to a drone showing a released attachment according to an embodiment of the invention.

Thereafter, the user flies the drone 12 in a conventional manner. Referring to FIG. 1B, when the attachment (e.g. 46) is to be released, the user simply actuates a switch on the remote controller 38 to cause bar 26 to retreat to the first position. In this manner, loop 44 and the attachment will be released and it will fall to the ground.

It will be understood by those of ordinary skill in the art that any of various mechanical gripping and releasing mechanisms may be used in embodiments of the invention. For example, any of respective clips, movable arms, releasable grippers that are controlled by a remote controller as described may be used to attach and then selectively release an attachment as set forth.

Having described the subject matter of the application with regard to specific embodiments, it is to be understood that the description is not meant as a limitation since further modifications and variations may be apparent or may suggest themselves to those skilled in the art. It is intended that the present application cover all such modifications and variations.

What is claimed is:

1. A unit for releasing an attachment from a drone, comprising:
   a housing configured to be mountable and removable from an underside surface of a drone, the housing comprising a top wall, a first side wall, a second side wall, a front wall, a rear wall and a bottom wall;
   the top wall configured to contact the underside surface of the drone;
   a release mechanism extending downwardly from the bottom wall, the release mechanism comprising a movable bar, the movable bar having a first end and a second terminal end, the movable bar configured to move in a first direction to assume a first position and configured to move in a second direction to assume a second position;
   a motor mechanically linked to the first end of the movable bar configured to drive the movable bar in the first direction and the second direction;
   a remote control receiver configured to receive a signal from a remote controller to move the movable bar in the first direction and second direction; and
   a slot configured to receive a strap that is configured to secure the housing to the underside surface of the drone.

2. The unit of claim 1, whereby the release mechanism further comprises a first post comprising a hole and second post comprising a pocket.

3. The unit of claim 2, whereby in the first position, the terminal end of the bar is positioned in the hole of the first post and in the second position, the terminal end of the bar is positioned in the pocket of the second post.

4. The unit of claim 1, further comprising a remote controller.

* * * * *